United States Patent
Jonietz et al.

(10) Patent No.: US 11,554,744 B2
(45) Date of Patent: Jan. 17, 2023

(54) COVERING CAP FOR AN AIRBAG MODULE AND AIRBAG MODULE HAVING SUCH A COVERING CAP

(71) Applicant: Dalphi Metal Espana, S.A., Vigo (ES)

(72) Inventors: Andreas Joachim Maria Jonietz, Vigo (ES); Luis Barandela Iglesias, Vigo (ES); Victor Jose Gonzalez Horta, Vigo (ES); Pedro Pereiro Coto, O Porrino (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 17/263,638

(22) PCT Filed: Aug. 5, 2019

(86) PCT No.: PCT/EP2019/071020
§ 371 (c)(1),
(2) Date: Jan. 27, 2021

(87) PCT Pub. No.: WO2020/030588
PCT Pub. Date: Feb. 13, 2020

(65) Prior Publication Data
US 2021/0284095 A1    Sep. 16, 2021

(30) Foreign Application Priority Data

Aug. 9, 2018 (DE) .......................... 202018104587.3

(51) Int. Cl.
*B60R 21/2165* (2011.01)
*B60R 21/203* (2006.01)
*B60R 21/215* (2011.01)

(52) U.S. Cl.
CPC .................. *B60R 21/21656* (2013.01); *B60R 2021/21543* (2013.01)

(58) Field of Classification Search
CPC . B60R 21/203; B60R 21/215; B60R 21/2165; B60R 21/21656; B60R 2021/21543
See application file for complete search history.

(56) References Cited

U.S. PATENT DOCUMENTS 6,099,027 A    8/2000 Shirk et al.
6,135,489 A    10/2000 Bowers
(Continued)

FOREIGN PATENT DOCUMENTS

DE    102004046866 A1 *  4/2005    ......... B60R 21/2165
DE    102008029656        12/2009
(Continued)

OTHER PUBLICATIONS

Machine translation of JP H05-139231 A. Retrieved from Internet on Oct. 8, 2021. (Year: 2021).*

*Primary Examiner* — Barry Gooden, Jr.
(74) *Attorney, Agent, or Firm* — Tarolli, Sundheim, Covell & Tummino LLP

(57) ABSTRACT

The invention relates to a cover cap (10) for an airbag module (12), especially for a driver airbag module, comprising a front panel (14) including an outer face (16) as well as an opposed inner face (18) which in the assembled state of the airbag module (12) faces a folded airbag (20), and an emblem (22) which is arranged and fastened at the inside of the front panel (14), wherein in the area of the emblem (22) the front panel (14) has an emblem opening (24) through which the emblem (22) is visible from the outer face (16) of the front panel (14), wherein the front panel (14) includes a tear line (26) along which the cover cap (10) tears upon activation of the assembled airbag module (12), and wherein the tear line (26) opens into the emblem opening (24) at an edge point (28) of the emblem opening (24). Furthermore, the invention also includes an airbag module (12) comprising said cover cap (10).

15 Claims, 3 Drawing Sheets

(56) References Cited

U.S. PATENT DOCUMENTS

| | | | |
|---|---|---|---|
| 6,247,724 B1* | 6/2001 | Jambor | B60R 21/21656 280/728.2 |
| 6,422,602 B1* | 7/2002 | Ishii | B60Q 5/003 280/728.2 |
| 6,443,484 B2 | 9/2002 | Anglsperger | |
| 6,550,803 B1* | 4/2003 | Derrick | B60R 21/2165 280/728.3 |
| 6,966,575 B2* | 11/2005 | Kobayashi | B60R 21/2165 280/728.3 |
| 10,000,175 B2* | 6/2018 | Coon | B60R 21/2165 |
| 2001/0017460 A1* | 8/2001 | Igawa | B60R 21/237 280/731 |
| 2001/0038195 A1 | 11/2001 | Cuevas et al. | |
| 2002/0005631 A1* | 1/2002 | Varcus | B60R 21/203 280/728.3 |
| 2002/0014764 A1* | 2/2002 | Anglsperger | B60R 21/216 280/743.1 |
| 2002/0030352 A1* | 3/2002 | Iida | B60R 21/21656 280/728.3 |
| 2002/0050704 A1* | 5/2002 | Abe | B60R 21/21656 280/743.1 |
| 2003/0178819 A1* | 9/2003 | Schneider | B60R 21/21656 280/728.3 |
| 2003/0209889 A1* | 11/2003 | Erwin | B60R 21/21656 280/728.3 |
| 2004/0021303 A1* | 2/2004 | Ford | B60R 21/21656 280/728.3 |
| 2004/0130131 A1* | 7/2004 | Thomas | B60R 21/2035 280/731 |
| 2004/0174002 A1* | 9/2004 | Sauer | B60R 21/2165 280/728.3 |
| 2005/0079305 A1* | 4/2005 | Krappmann | B29C 45/73 428/35.7 |
| 2005/0156408 A1* | 7/2005 | Amamori | B60R 21/21656 280/728.3 |
| 2005/0275197 A1* | 12/2005 | Kaifuki | B60R 21/21656 280/728.3 |
| 2007/0290487 A1* | 12/2007 | Kreuzer | B60R 21/21656 280/728.3 |
| 2008/0036184 A1* | 2/2008 | Takagi | B60R 21/21656 280/728.3 |
| 2008/0079241 A1* | 4/2008 | Fujimori | B60R 21/21656 280/727 |
| 2008/0252050 A1* | 10/2008 | Aparicio | B60R 21/2165 280/728.3 |
| 2009/0058055 A1 | 3/2009 | Fujimori et al. | |
| 2009/0218793 A1* | 9/2009 | Kraus | B60R 21/21656 280/728.3 |
| 2011/0101653 A1* | 5/2011 | Rick | B60R 21/21656 280/728.3 |
| 2011/0109066 A1* | 5/2011 | Rick | B60R 21/21656 280/728.3 |
| 2011/0116251 A1* | 5/2011 | Rick | B60Q 3/68 362/84 |
| 2012/0074672 A1* | 3/2012 | Iida | B60R 21/21656 280/728.2 |
| 2013/0277952 A1* | 10/2013 | Jung | B60R 21/21656 280/728.3 |
| 2013/0285355 A1* | 10/2013 | Muramatsu | B60R 21/2165 280/728.3 |
| 2014/0145419 A1* | 5/2014 | Ishikawa | B60R 21/215 280/728.3 |
| 2015/0251625 A1* | 9/2015 | Bana Castro | B60R 21/2155 280/728.3 |
| 2017/0113644 A1* | 4/2017 | Coon | B60R 21/2165 |
| 2017/0259773 A1* | 9/2017 | Einarsson | B60R 21/2035 |
| 2019/0126881 A1* | 5/2019 | Rilat | B60R 21/2165 |
| 2021/0291776 A1* | 9/2021 | Jonietz | B60R 21/21658 |

FOREIGN PATENT DOCUMENTS

| | | |
|---|---|---|
| JP | 05139231 | 6/1993 |
| WO | 2015144313 | 10/2015 |

* cited by examiner

COVERING CAP FOR AN AIRBAG MODULE AND AIRBAG MODULE HAVING SUCH A COVERING CAP

RELATED APPLICATIONS

This application corresponds to PCT/EP2019/071020, filed Aug. 5, 2019, which claims the benefit of German Application No. 20 2018 104 587.3, filed Aug. 9, 2018, the subject matter of which are incorporated herein by reference in their entirety.

BACKGROUND OF THE INVENTION

The invention relates to a cover cap for an airbag module, especially for a driver airbag module, as well as to an airbag module for a vehicle occupant restraint system comprising said cover cap.

Driver airbag modules usually are accommodated in the hub area of a vehicle steering wheel and, as a rule, comprise a module cover facing the occupant including an emblem fastened to the module cover. An emblem in this context is understood to be a logo of the car manufacturer, a lettering and/or any other decorating element, for example, which is attached to the cover cap of the airbag module.

From prior art numerous emblems are known which are attached to an outer face of the cover cap facing the occupant and are fixed there tightly and reliably so that they will not come off a front panel of the cover cap upon activation of the airbag module.

In order to achieve a defined reproducible deployment behavior of the airbag upon activation of the airbag module, the front panel of the cover cap usually has a so-called tear line, i.e. a weakened zone at which the front panel tears in a controlled manner when pressure is applied. This tear line defines front panel portions which can be pivoted like flaps and which enable the airbag to exit and deploy in the direction of the occupant. Usually, the tear line is guided around the emblem so that the emblem remains safely fastened to one of the flap-type front panel portions.

Apart from safeguarding reduced resistance to deployment as well as defined deployment behavior of the airbag, the tear line also has to be sufficiently robust so that it will not inadvertently tear, for example, upon actuation of the horn during normal driving operation. Moreover, the tear line of the cover cap is intended not to be visible for the occupant.

SUMMARY OF THE INVENTION

It is the object of the invention to provide a cover cap adapted to be manufactured at low cost which is sufficiently robust during normal driving operation, safeguards defined deployment behavior of the airbag in the case of release of the airbag module and, moreover, permits great freedom in designing the emblem.

In accordance with the invention, this object is achieved by a cover cap for an airbag module, especially for a driver airbag module, comprising a front panel having an outer face as well as an opposed inner face which in the assembled state of the airbag module faces a folded airbag package, and comprising an emblem which is arranged and fastened at the inside of the front panel, wherein the front panel in the area of the emblem includes an emblem opening through which the emblem is visible from the outer face of the front panel, wherein the front panel has a tear line along which the cover cap tears upon activation of the assembled airbag module, and wherein the tear line ends in the emblem opening at an edge point of the emblem opening. In other words, the tear line is directly adjacent to the emblem opening and, resp., is transformed into the latter, the tear line encountering the edge of the emblem opening especially substantially perpendicularly. Consequently, with such rear-side or inside mounting of the emblem the emblem openings are advantageously integrated in the opening or tearing line. The edge points at which the emblem openings are transformed into the tear line after activation of the airbag module form the starting points for the tearing of the cover cap when pressure is applied. Since the emblem openings preferably are provided quite centrally in the front panel, a tearing behavior of the cover cap "from the inside to the outside" ensues without any additional manufacturing effort from which in turn an especially advantageous deployment behavior of the airbag will be resulting.

According to one embodiment of the cover cap, the tear line is formed by a panel recess provided on the inner face of the front panel, especially by a linear trough-shaped panel recess or notch. In this way, the tear line is not visible for a vehicle occupant.

Preferably, the tear line is interrupted by the emblem opening and ends in the emblem opening at two edge points of the emblem opening spaced apart from each other and especially opposing each other. Starting from an especially centrally located emblem opening, the front panel then tears from the inside to the outside substantially symmetrically, which in turn contributes to an advantageous deployment behavior of the airbag.

According to another embodiment of the cover cap, two separate emblem openings spaced apart from each other are provided which are connected to each other by a connecting portion of the tear line. The connecting portion of the tear line at one end thus ends into the one of the two emblem openings and at the opposite end ends in the other of the two emblem openings.

Of preference, the front panel exhibits a weakened panel and a remaining residual panel thickness in the area of the tear line, wherein in the area of the connecting portion of the tear line the front panel has a residual panel thickness which is larger than a residual panel thickness outside said connecting portion. During normal driving operation of the vehicle, it has turned out that the cover cap is especially highly loaded in the area of the mostly centrally located and comparatively short connecting portion, for example when the vehicle horn is actuated. The larger residual panel thickness in the area of the connecting portion reliably prevents the front panel from inadvertently tearing in a simple manner during normal driving operation without excessively increasing the resistance to deployment of the cover cap upon activation of the airbag module.

Furthermore, the emblem in this embodiment of the cover cap may especially be a two-part design and may include two separate emblem elements spaced apart from each other, with a separate emblem opening being associated with each of the emblem elements.

Preferably, the tear line of the front panel is approximately H-shaped and includes two opposite edge portions as well as a central portion extending through a central area of the front panel and connecting the edge portions, with the tear line being interrupted in the area of its central portion by at least one emblem opening.

On the inner face of the front panel stiffening ribs may be provided adjacent to the emblem or around the emblem, especially integrally formed with the same. Said stiffening ribs ensure lower deformability of the front panel in the area of the emblem. Said stiffening in the central area of the front panel helps minimize the probability of the tear line inadvertently tearing, for example when the horn is actuated during normal driving operation.

Further, on the inner face of the front panel plural pins for fastening the emblem may be provided and especially integrally formed. This allows to quickly and reliably fasten the emblem with little effort to the cover cap. The pins are fusible pins, for example, which engage in associated recesses of the emblem and are subsequently heated and deformed. Alternatively, also locking pins which are locked in the emblem recesses are imaginable.

Incidentally, the invention also relates to an airbag module for a vehicle occupant restraint system, comprising a module housing which includes an afore-described cover cap, an airbag which is accommodated as a folded airbag package in the module housing when the airbag module is deactivated, and an inflator for inflating the airbag upon activation of the airbag module.

BRIEF DESCRIPTION OF THE DRAWINGS

Further features and advantages of the invention will be evident from the following description of a preferred embodiment with reference to the drawings, wherein.

DESCRIPTION

Figure 4:
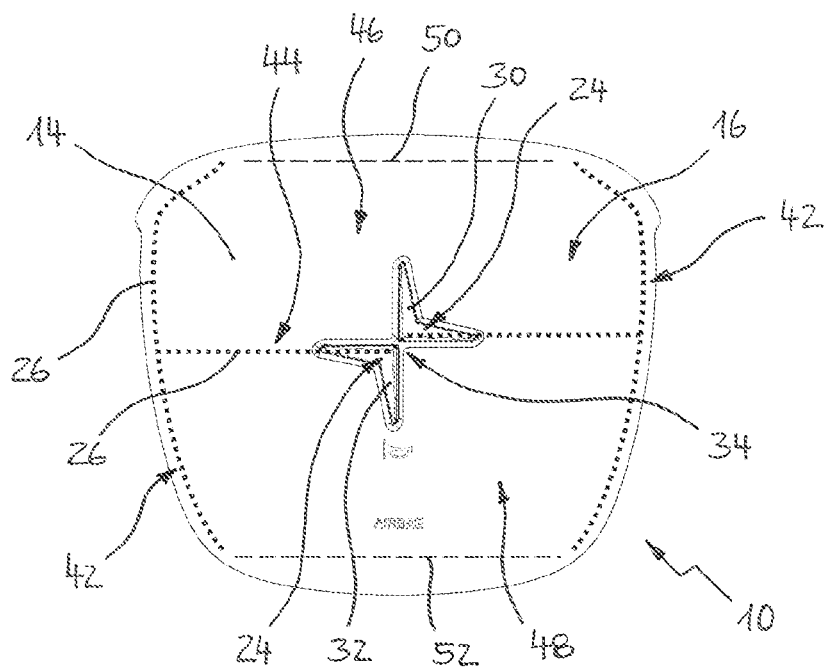
FIG. 4 shows a view of an outer face of the cover cap according to FIG. 1 after mounting the emblem.
Figure 5:
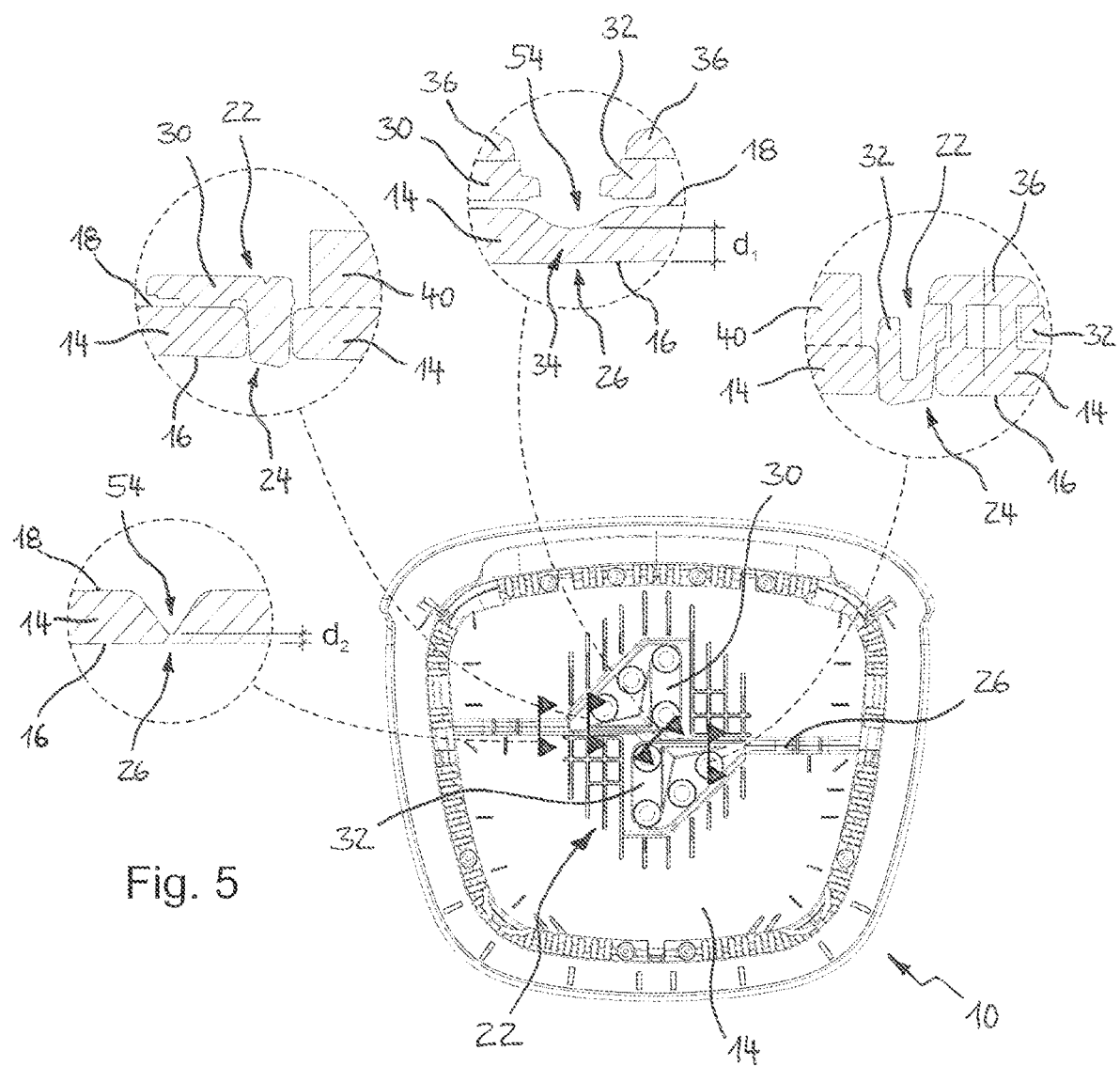
FIG. 5 shows a view of an inner face of the cover cap according to FIG. 1 after mounting the emblem as well as plural section details of the cover cap.
Figure 6:
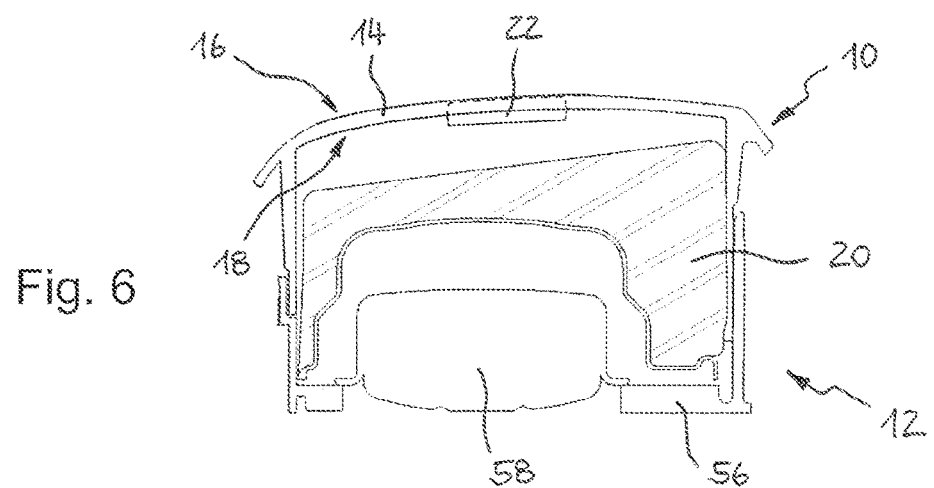
FIG. 6 shows a schematic section across an airbag module according to the invention comprising a cover cap according to the invention.

FIGS. 1 to 5 illustrate a cover cap 10 of an airbag module 12 schematically represented in FIG. 6 comprising a front panel 14 including an outer face 16 as well as an opposed inner face 18 which in the assembled state of the airbag module 12 faces a folded airbag 20, and comprising an emblem 22 which is arranged and fastened on the inner face of the front panel 14. In the area of the emblem 22 the front panel 14 has an emblem opening 24 through which the emblem 22 is visible from the outer face 16 of the front panel 14, wherein the front panel 14 includes a tear line 26 along which the cover cap 10 tears upon activation of the assembled airbag module 12, and wherein the tear line 26 ends in the emblem opening 24 at an edge point 28 of the emblem opening 24. In other words, the tear line 26 is directly adjacent to the emblem opening 24 and, resp., is transformed into the latter.

Figure 1:
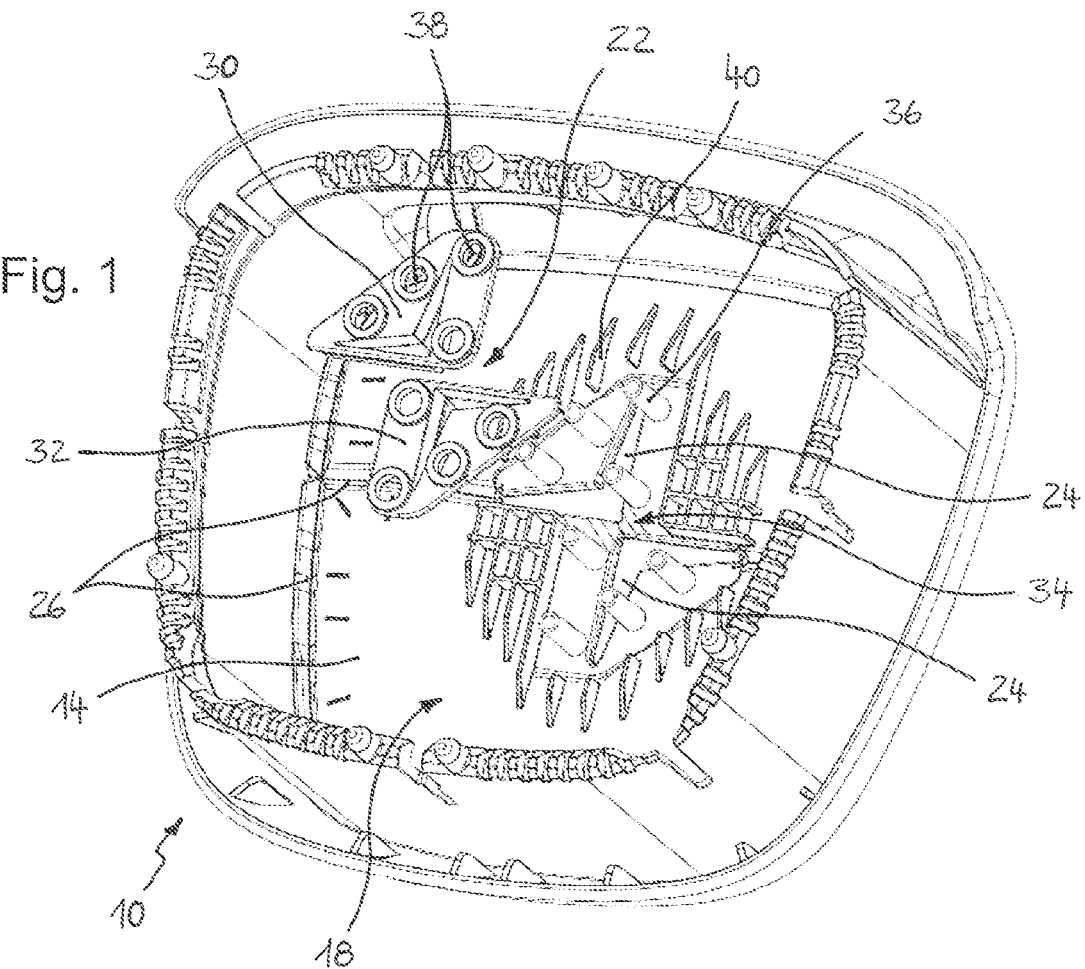
FIG. 1 shows a perspective exploded view of a cover cap according to the invention including a two-part emblem.

By way of FIG. 1, it is clearly evident that the emblem 22 in the present configuration variant of the cover cap 10 is a two-part design and includes two separate emblem elements 30, 32 spaced apart from each other with each of which an emblem opening 24 is associated here.

In the front panel 14 of the cover cap 10, consequently two separate emblem openings 24 spaced apart from each other are provided which are connected to each other by a connecting portion 34 of the tear line 26. Said connecting portion 34 thus ends at its one end in the one of the two emblem openings 24 and at its opposite end ends in the other one of the two emblem openings 24.

Figure 2:
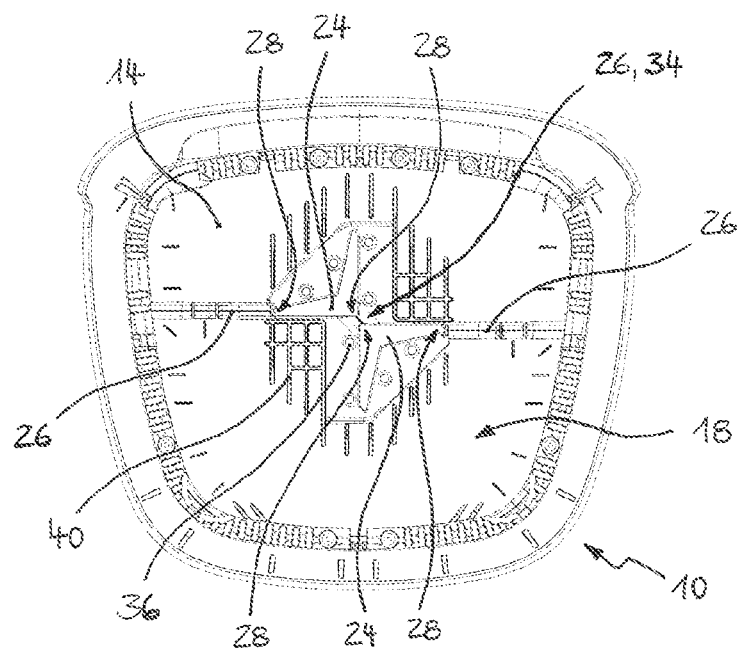
FIG. 2 shows a view of an inner face of the cover cap according to FIG. 1 prior to mounting the emblem.

FIG. 2 illustrates an inside view of the cover cap 10 without the emblem elements 30, 32. It becomes clear that the tear line 26 is interrupted by the two emblem openings 24 and ends in the respective emblem opening 24 at two approximately opposed edge points 28 of each emblem opening 24.

On the inner face 18 of the front panel 14 plural pins 36 for fastening the emblem 22 are provided, especially formed integrally therewith. In the shown embodiment, said pins 36 are fusible pins which during assembly of the emblem 22 engage in associated recesses 38 of the emblem elements 30, 32 and then are plastically deformed while thermal energy is supplied. Due to the plastic deformation, the fusible pins are widened at their free ends and overlap the edges of the associated recesses 38 (cf. FIG. 3) so that the emblem 22 is finally tightly and reliably fixed to the front panel 14. The pins 36 may as well be locking pins instead of fusible pins, as a matter of course, and may be locked with the emblem elements 30, 32.

Figure 3:
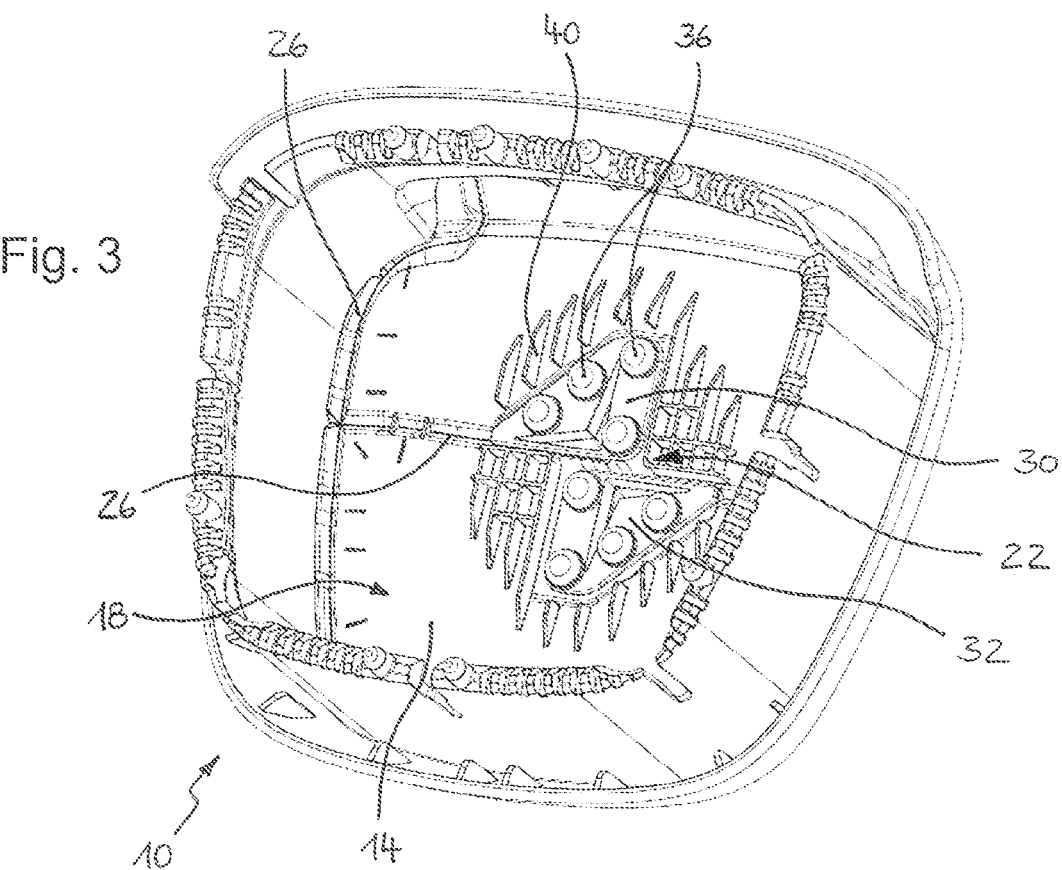
FIG. 3 shows a perspective view of the cover cap according to FIG. 1 after mounting the emblem.

According to FIG. 3, on the inner face 18 of the front panel 14 plural stiffening ribs 40 are provided which are formed especially integrally with the cover cap 10. Said stiffening ribs 40 are adjacent to the emblem 22 and are arranged especially in a central area of the front panel 14 around the emblem 22. In this way, the deformability of the central front panel area is reduced and the material of the cover cap 10 is loaded to a lesser extent, for example upon actuation of the horn. Accordingly, inadvertent bursting of the tear line 28, especially in the area of the connecting portion 34, can be largely excluded with common everyday use over the service life of the airbag module 12.

FIG. 4 shows an outside view of the cover cap 10 according to FIG. 3, with the emblem 22 and, resp., the emblem elements 30, 32 being visible on the outer face 16 of the front panel 14 through the emblem openings 24. Furthermore, in FIG. 4 an opening line of the cover cap 10 is indicated by a dotted line, with the opening line being composed of the tear line 26 and portions of the emblem openings 24.

The tear line 26 of the front panel 14 is approximately H-shaped and includes two opposite edge portions 42 as well as a central portion 44 extending through a central area of the front panel 14 and connecting the edge portions 42, the tear line 26 being interrupted in the area of its central portion 44 by the emblem openings 24.

Upon activation of the airbag module 12, the opening line helps define front panel portions 46, 48 which are pivoting like flaps and which enable the airbag 20 to exit and deploy in the direction of the occupant. According to FIG. 4, an upper front panel portion 46 pivoting upwards about a cover cap hinge 50 indicated by broken lines and a lower front panel portion 48 pivoting downwards about a cover cap hinge 52 indicated by broken lines is formed.

FIG. 5 illustrates an inside view of the cover cap 10 according to FIG. 3 as well as plural section details in the area of the opening or tear line 26. It becomes clear in this context that the front panel 14 in the area of the tear line 26 includes a weakened panel and a remaining residual panel thickness $d_1$, $d_2$, the front panel 14 having a residual panel thickness $d_1$ which is larger than a residual panel thickness $d_2$ outside said connecting portion 34 in the area of the connecting portion 34 of the tear line 26 between the two emblem openings 24. In this way, the tear line 26 is especially reliably prevented from inadvertently tearing in a simple manner in the area of the connecting portion 34 which is relatively highly loaded when the horn is actuated.

The weakened panel of the front panel 14 in the area of the tear line 26 in the shown configuration variant is formed by a panel recess 54 provided on the inner face 18 of the front panel 14. Consequently, the tear line is not visible for an occupant on the outer face 16 of the front panel 14.

Finally, FIG. 6 illustrates a schematic section of the airbag module 12 for a vehicle occupant restraint system, comprising a module housing 56 which includes an afore-described cover cap 10, an airbag 20 which is accommodated in the module housing 56 as a folded airbag package when the airbag module 12 is deactivated, and an inflator 58 for inflating the airbag 20 upon activation of the airbag module 12.

The shown airbag module 12 in this case is a driver airbag module and, after being mounted, is arranged in the hub area of a vehicle steering wheel.

The invention claimed is:

1. A cover cap for an airbag module (12), comprising:
a front panel (14) including an outer face (16) as well as an opposed inner face (18) which in an assembled state of the airbag module (12) faces a folded airbag (20), and
at least one emblem (22) fastened to the front panel (14),
wherein in an area of the at least one emblem (22) the front panel (14) has two separate emblem openings (24), wherein the at least one emblem (22) is installed from and fastened to the inner face (18) of the front panel (14), engages the inner face (18) of the front panel (14) along the peripheries of the two emblem openings (24), and is visible through the two emblem openings (24)—from the outer face (16) of the front panel (14), and
wherein the front panel (14) includes a tear line (26) along which the cover cap (10) tears upon activation of the assembled airbag module (12),
wherein each of the two emblem openings (24) comprises at least one edge point (28), and wherein the tear line (26) opens into each of the two emblem openings (24) at an edge point (28) of the emblem opening (24), and
wherein the two emblem openings (24) are spaced apart from each other and connected to each other by a connecting portion (34) of the tear line (26).

2. The cover cap according to claim 1, wherein the tear line (26) is formed by a panel recess (54) provided on the inner face (18) of the front panel (14).

3. The cover cap according to claim 1, wherein the tear line (26) is interrupted by each of the two emblem openings (24) at two of the at least one edge point (28) which are spaced apart from each other in their respective emblem opening (24).

4. The cover cap according to claim 1, wherein the at least one emblem (22) is a two-part design and includes two separate emblem elements (30, 32) spaced apart from each other, wherein each of the emblem elements (30, 32) is associated with a corresponding one of the two separate emblem openings (24).

5. The cover cap according to claim 1, wherein the front panel (14) in an area of the connecting portion (34) of the tear line (26), has a first residual panel thickness ($d_1$) which is larger than a second residual panel thickness ($d_2$) outside said connecting portion (34).

6. The cover cap according to claim 1, wherein the tear line (26) of the front panel (14) is approximately H-shaped and includes two opposite edge portions (42) as well as a central portion (44) extending through a central area of the front panel (14) and connecting the edge portions (42), the tear line (26) being interrupted in an area of the central portion (44) by the two emblem openings (24).

7. The cover cap according to claim 1, wherein on the inner face (18) of the front panel (14) reinforcing ribs (40) are provided adjacent to the at least one emblem (22).

8. The cover cap according to claim 1, wherein on the inner face of the front panel (14) plural pins (36) are provided for fastening the at least one emblem (22).

9. An airbag module for a vehicle occupant restraint system, comprising:
a module housing (56) which includes a cover cap (10) according to claim 1,
an airbag (20) which is accommodated in the module housing (56) as a folded airbag package when the airbag module (12) is deactivated, and
an inflator (58) for inflating the airbag (20) upon activation of the airbag module (12).

10. The cover cap according to claim 1, wherein the front panel (14) comprises a weakened panel portion in the an area of the tear line (26) and has a residual panel thickness in remaining portions of the front panel (14).

11. A cover cap for an airbag module (12), comprising:
a front panel (14) including an outer face (16) as well as an opposed inner face (18) which in an assembled state of the airbag module (12) faces a folded airbag (20), and
an emblem (22) having a two-part design including two separate emblem elements (30, 32) that are spaced apart from each other and fastened at an inside of the front panel (14),
wherein in an area of each of the emblem elements (30, 32) the front panel (14) has an emblem opening (24) through which the corresponding emblem element (30, 32) is visible from the outer face (16) of the front panel (14), and
wherein the front panel (14) includes a tear line (26) along which the cover cap (10) tears upon activation of the assembled airbag module (12),
wherein each of the two emblem openings (24) comprises at least one edge point (28), and wherein the tear line (26) opens into each of the two emblem openings (24) at an edge point (28) of the emblem opening (24).

12. A cover cap for an airbag module (12), comprising:
a front panel (14) including an outer face (16) as well as an opposed inner face (18) which, in an assembled state of the airbag module (12), faces a folded airbag (20), and
at least one emblem (22) which is arranged and fastened at an inside of the front panel (14),
wherein, in an area of the at least one emblem (22), the front panel (14) has at least one emblem opening (24) through which the at least one emblem (22) is visible from the outer face (16) of the front panel (14),
wherein the front panel (14) includes a tear line (26) along which the cover cap (10) tears upon activation of the assembled airbag module (12),
wherein the tear line (26) opens into each of the at least one emblem openings (24) at an edge point (28) of the emblem opening (24), and
wherein, on the inner face (18) of the front panel (14), reinforcing ribs (40) are provided adjacent to the at least one emblem (22).

13. A cover cap for an airbag module (12), comprising:
a front panel (14) including an outer face (16) as well as an opposed inner face (18) which in an assembled state of the airbag module (12) faces a folded airbag (20), and
at least one emblem (22) which is arranged and fastened at an inside of the front panel (14),
wherein in an area of the at least one emblem (22) the front panel (14) has two separate emblem openings (24) through which the at least one emblem (22) is visible from the outer face (16) of the front panel (14),
wherein the front panel (14) includes a tear line (26) along which the cover cap (10) tears upon activation of the assembled airbag module (12),
wherein each of the two emblem openings (24) comprises at least one edge point (28), and wherein the tear line (26) opens into each of the two emblem openings (24) at an edge point (28) of the emblem opening (24),
wherein the emblem openings (24) are spaced apart from each other and connected to each other by a connecting portion (34) of the tear line (26), and
wherein the at least one emblem (22) is a two-part design and includes two separate emblem elements (30, 32) spaced apart from each other, wherein each of the emblem elements (30, 32) is associated with a corresponding one of the two separate emblem openings (24).

14. A cover cap for an airbag module (12), comprising:
a front panel (14) including an outer face (16) as well as an opposed inner face (18) which in an assembled state of the airbag module (12) faces a folded airbag (20), and
at least one emblem (22) which is arranged and fastened at an inside of the front panel (14),
wherein in an area of the at least one emblem (22) the front panel (14) has two separate emblem openings (24) through which the at least one emblem (22) is visible from the outer face (16) of the front panel (14),
wherein the front panel (14) includes a tear line (26) along which the cover cap (10) tears upon activation of the assembled airbag module (12),
wherein each of the two emblem openings (24) comprises at least one edge point (28), and wherein the tear line (26) opens into each of the two emblem openings (24) at an edge point (28) of the emblem opening (24),
wherein the emblem openings (24) are spaced apart from each other and connected to each other by a connecting portion (34) of the tear line (26), and
wherein the front panel (14) in an area of the connecting portion (34) of the tear line (26), has a first residual panel thickness ($d_1$) which is larger than a second residual panel thickness ($d_2$) outside said connecting portion (34).

15. A cover cap for an airbag module (12), comprising:
a front panel (14) including an outer face (16) as well as an opposed inner face (18) which in an assembled state of the airbag module (12) faces a folded airbag (20), and
at least one emblem (22) which is arranged and fastened at an inside of the front panel (14),
wherein in an area of the at least one emblem (22) the front panel (14) has two separate emblem openings (24) through which the at least one emblem (22) is visible from the outer face (16) of the front panel (14),
wherein the front panel (14) includes a tear line (26) along which the cover cap (10) tears upon activation of the assembled airbag module (12),
wherein each of the two emblem openings (24) comprises at least one edge point (28), and wherein the tear line (26) opens into each of the two emblem openings (24) at an edge point (28) of the emblem opening (24),
wherein the emblem openings (24) are spaced apart from each other and connected to each other by a connecting portion (34) of the tear line (26), and
wherein on the inner face (18) of the front panel (14) reinforcing ribs (40) are provided adjacent to the at least one emblem (22).

* * * * *